United States Patent
Schmitz et al.

[15] 3,704,721
[45] Dec. 5, 1972

[54] FLUID CONTROL SYSTEM

[72] Inventors: Ambrose J. Schmitz, Hoffman Estates; William R. McCarty, Skokie; Howard L. Erickson, Bensenville, all of Ill.

[73] Assignee: Eaton Corporation, Cleveland, Ohio

[22] Filed: Oct. 1, 1970

[21] Appl. No.: 77,157

[52] U.S. Cl. ............... 137/102, 137/596.16, 251/30, 251/305
[51] Int. Cl. ............................................. F16k 31/42
[58] Field of Search ............ 137/102, 596.14, 596.16; 251/25, 30, 305, 306

[56] References Cited

UNITED STATES PATENTS

| | | | |
|---|---|---|---|
| 3,399,689 | 9/1968 | Keane | 251/30 X |
| 2,973,935 | 3/1961 | Sullivan | 251/30 |
| 3,568,975 | 3/1971 | Obermaier | 251/306 X |
| 1,643,753 | 9/1927 | Slattery | 251/306 X |
| 2,744,719 | 5/1956 | McRae | 251/25 X |
| 2,910,266 | 10/1959 | Condello et al. | 251/305 X |
| 3,396,848 | 8/1968 | Kozel | 251/30 X |

Primary Examiner—Robert G. Nilson
Attorney—Teagno & Toddy

[57] ABSTRACT

A fluid control system for dishwashers, clothes washers, and the like. A series type fill valve has a hydraulic actuator located between the two valve operators and controlling a drain valve through a mechanical linkage. A flow control device at the inlet to the first valve maintains the pressure at the actuator at a level too low for activation during a fill cycle when both solenoid operated valves are open. Draining is effected by opening of the first valve only, which pressurizes the linear actuator to open the drain valve. Means are provided for bleeding off pressure at the actuator when both solenoid operated valves are closed to prevent inadvertent opening of the drain valve.

10 Claims, 3 Drawing Figures

AMBROSE J. SCHMITZ,
WILLIAM R. MCCARTY &
HOWARD L. ERICKSON
INVENTORS

BY

TEAGNO & TODDY
ATTORNEYS

AMBROSE J. SCHMITZ,
WILLIAM R. MCCARTY &
HOWARD L. ERICKSON
INVENTORS

BY

TEAGNO & TODDY
ATTORNEYS

FLUID CONTROL SYSTEM

This invention relates to a fluid control system and more particularly to a combination fill and drain valve for an automatic dishwasher or the like.

Automatic appliances such as dishwashers, clothes washers, and the like require valves for filling and draining which operate automatically according to a time sequence. Ordinarily, such fill and drain valves are separate and distinct units, each requiring a valve element and a solenoid to actuate the valve element. In order to provide maximum protection against flooding of the room in which the washer is operated, it is desirable to provide an additional solenoid actuated fill valve in series with the first so that malfunction of one of the valves will not prevent automatic shut-off of the water supply.

From the standpoint of both cost and space, it would be most desirable to combine the functions of the above valves into a single integrated unit without sacrificing performance or safety.

Accordingly, it is an object of the present invention to provide a fluid control system for a dishwasher or the like in which the fill and drain valves are combined into a single assembly.

Another object of the invention is to provide such a system which retains the safety features of a dual fill valve, that is, one in which two independent solenoid valve elements must be opened in order to effect filling of the machine.

Another object of the invention is to provide such a combination valve assembly employing only two solenoid elements.

Another object of the invention is to provide such a combination in which the drain valve element, in particular, provides complete shut-off in the closed position and substantially unrestricted flow in the open position.

Another object of the invention is to provide such a combination valve in which operating power requirements are minimized.

Another object of the invention is the provision of such a valve which is essentially noiseless in operation.

To meet the above objectives, the present invention provides a fluid control system comprising two solenoid-actuated fill valve elements in series having a pressure tap between them in communication with a pressure-operated linear actuator. The actuator controls the opening and closing of a butterfly-type drain valve.

To fill the washtub, both series elements must be opened. Opening of the first valve element only pressurizes the actuator to open the drain valve. When both valve elements are open, a flow control at the inlet to the first element reduces the pressure to the actuator to a level insufficient to operate it, thus obviating opening of the drain valve during a fill cycle. Means are also provided to prevent a pressure buildup at the pressure tap when both valve elements are closed to prevent inadvertent opening of the drain valve.

The above arrangement is particularly adaptable to the use of a drain valve of the butterfly type which has the advantages of noiseless operation, straight-through flow capability, and which can be designed to "blow closed" to provide positive sealing.

Other objects and advantages will be apparent from the specification when taken in connection with the accompanying drawings, wherein.

Figure 1:
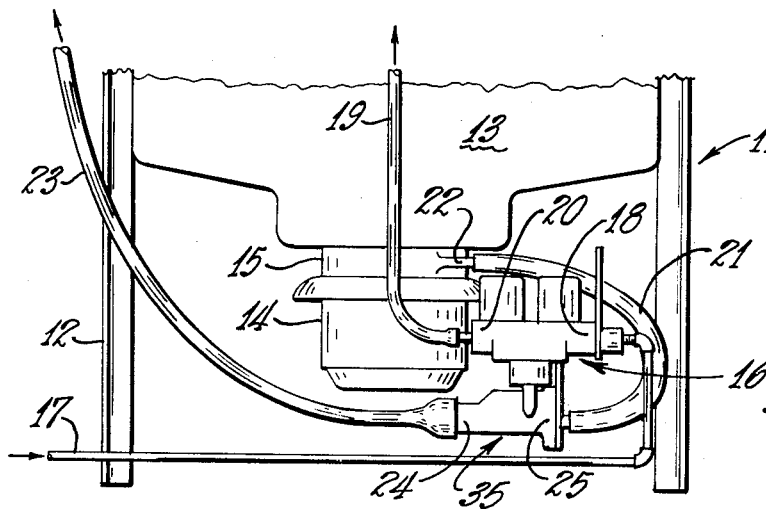
FIG. 1 is a fragmentary front elevation of a washing apparatus incorporating the fluid control system of the invention.

Referring to the drawings, in FIG. 1 there is illustrated a dishwasher, designated generally by the numeral 11, comprising a supporting cabinet 12, a washtub 13, motor 14, drain pump 15 and a combination fill and drain valve assembly 16. Hot water is delivered to the tub 13 by a supply line 17 connected to the fill inlet 18 of valve assembly 16, and a hose 19 connecting the tub with the fill outlet 20 of the valve. A drain hose 21 connects the drain outlet 22 of the pump 15 to the drain inlet 25 of valve assembly 16, and a hose 23 connects the drain outlet 24 to the household sewer system.

Figure 2:
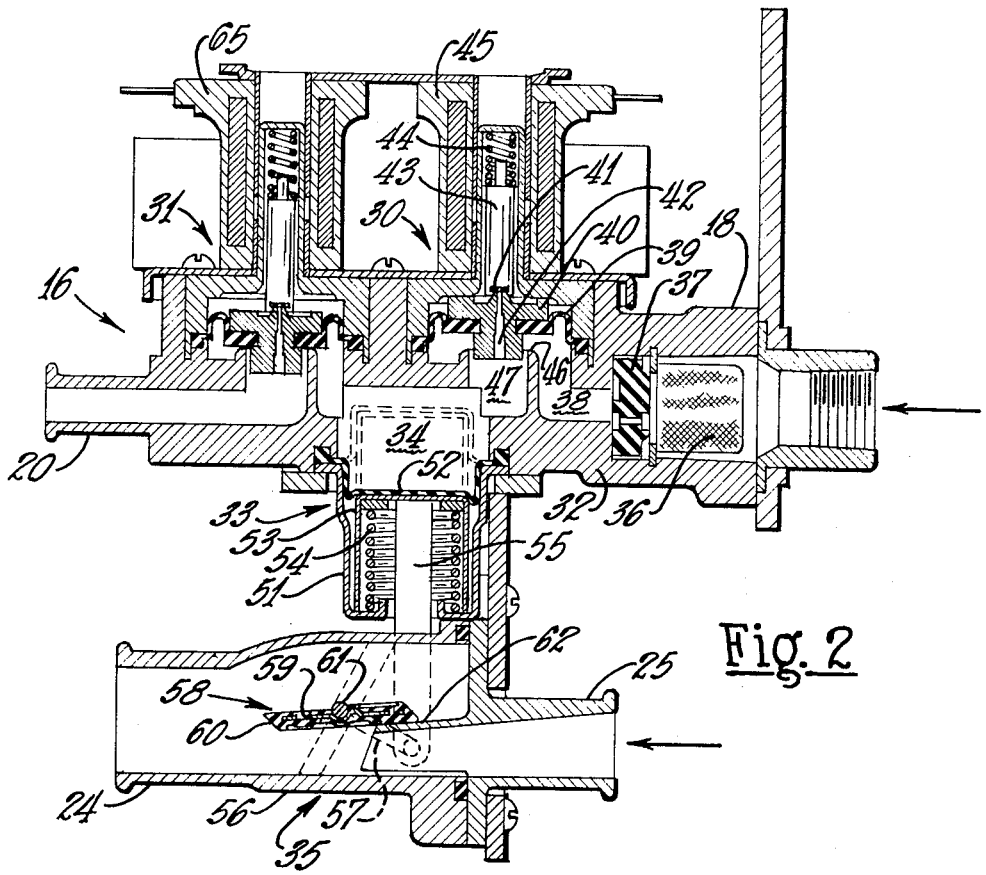
FIG. 2 is an enlarged transverse sectional view of the fill and drain valve.

Referring to FIG. 2, the combination fill and drain valve 16 comprises first and second solenoid operated valve elements 30 and 31 within an integral housing 32, a pressure operated linear actuator 33 communicating with a chamber 34 constituting a pressure tap between the two valve elements, and a butterfly valve 35 actuated by the linear actuator.

The inlet 18 to the first valve element 30 includes a filter screen 36 and a flow control washer 37, the flow control washer being of a well-known type which contracts under pressure in order to maintain a substantially constant downstream pressure under varying inlet pressure conditions.

The first solenoid valve element 30 communicates with the downstream side of the flow control washer by means of a passage 38 formed in the valve body 32 and is illustrated herein as being of the pilot operated diaphragm type. The valve essentially comprises a diaphragm 39, a pilot valve seat member 40 operatively attached to the diaphragm, a pilot valve element 41 operable to open and close a pilot orifice 42 in the seat member 50, and a core member 43, which carries the pilot valve 41. The core member and valve are held in a normally closed position by a spring 44 and is moved upward to open the pilot orifice by means of a solenoid 45. Opening of the pilot valve causes the diaphragm to move off a seat 46 formed in the valve body to open the main valve outlet passage 47.

The outlet passage 47 of the first valve element 30 opens into the chamber or pressure tap 34 of the linear actuator 33. The actuator 33, illustrated in its energized position in FIG. 2, comprises a housing 51 bolted or otherwise fastened to the valve body 32, a rolling diaphragm 52 clamped between the housing and the valve body, a piston 53 through which movement of the diaphragm is transferred, and a spring 54 acting between the housing 51 and the piston. The spring normally biases the diaphragm upward in its de-energized position as indicated in full line in FIG. 3 and by the broken lines in FIG. 2. An actuating rod 55 is connected to the piston 53 and depends downward therefrom through an opening in the housing 51 and ends adjacent the body 56 of butterfly valve 35. The end of rod 55 is pivotally attached to a crank arm 57 which actuates the butterfly element 58 of the valve.

The butterfly valve comprises the body 56, including inlet connection 25 and outlet connection 24 and, the butterfly element 58. The butterfly element 58 comprises a metallic insert 59 and a resilient sealing element 60 molded to the insert. One end 61 of the crank arm 57 extends through the valve body 56 perpendicular to the direction of flow and is welded or otherwise fastened to the metallic insert 59.

A deflector or baffle 62 formed in the inlet side of the valve body 56 deflects all flow below the end 61 of the crank arm and prevents waste material from wrapping around the butterfly element. The butterfly element 58 is slightly overbalanced in the "blow closed" position to allow drain pump pressure to aid in keeping the valve closed during a wash or rinse cycle. The drain pump runs continuously during all dishwasher cycles except drying.

When the chamber 34 above the rolling diaphragm 52 is pressurized, the diaphragm moves downward from the broken line to the solid line position of FIG. 2 forcing the piston and attached rod downward to move the butterfly valve from a closed (broken line) position to an open (full line) position.

Valve 31 is a solenoid valve similar to the valve element 30 and need not be described in detail. Suffice it to say that energizing the solenoid 65 of valve 31 operates to open the valve to transfer fluid from the outlet passage 47 of valve 30 to the inlet passage of valve element 31, (through chamber 34) and then outward through the fill outlet 20 to the fill hose 19.

To operate the valve 16 in the fill mode of a typical washer cycle, both solenoids 45 and 65 are energized, placing fill valve elements 30 and 31 in their open positions to establish a flow path from the inlet 18, through valve element 30, chamber 34, and valve element 31 to the fill hose 19. The flow control washer 37 at the inlet of valve 30 is designed to provide a predetermined pressure drop across valve 16 under flow conditions, for example, 2 psi. The linear actuator 33, however, is designed to operate at a higher pressure, for example, 6-12 psi, such that when flow is established through valves 30 and 31, the spring 54 maintains the actuator 33 in its de-energized position. Thus the drain valve remains closed during this portion of the cycle.

Figure 3:
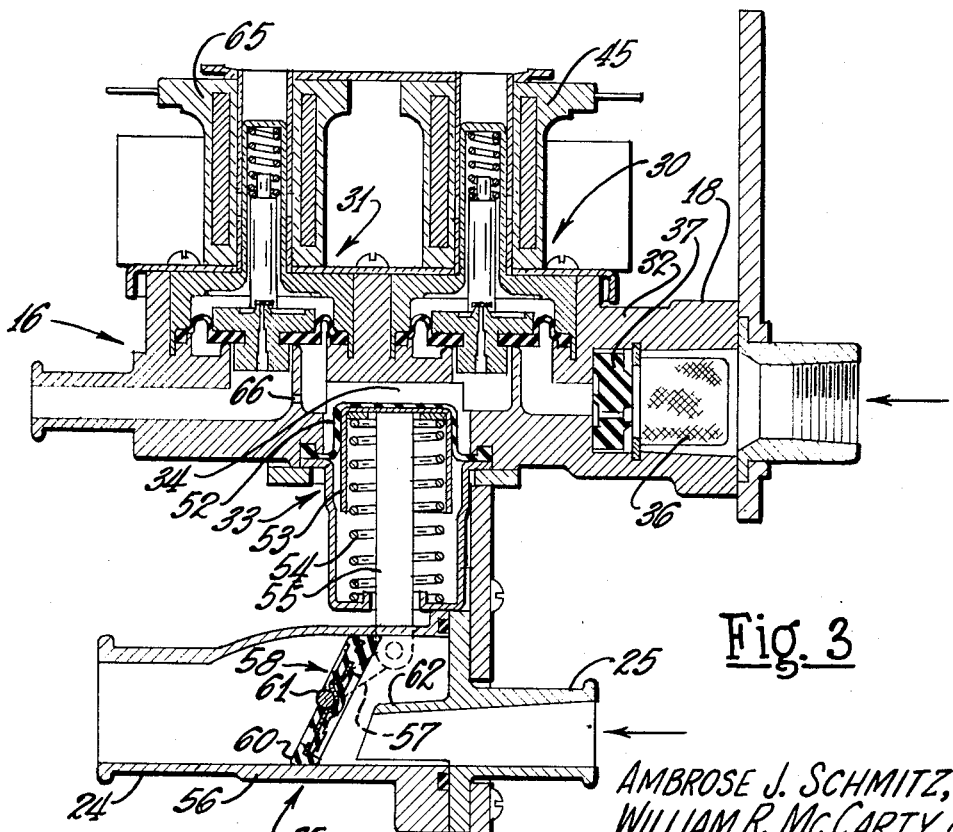
FIG. 3 is an enlarged transverse sectional view of an alternative embodiment of the invention.

At the end of a fill cycle, the valve elements 30 and 31 are operated in a prescribed manner in order to prevent a pressure build-up in chamber 34 which could cause premature opening of the drain valve 35. This can be accomplished either by employing a slow-closing valve as valve element 31, allowing time for the pressure in chamber 34 to bleed off, or the cycle can be set up such that the valve element 31 always closes after valve element 30 to provide the required bleed-off of pressure in chamber 34. An alternative method, illustrated in FIG. 3, is to include a bleed port 66 between chamber 34 and the outlet of valve element 31. This bleeds unwanted pressure into the machine, but has the disadvantage of allowing a small amount of fill water to enter the tub during the drain cycle. To better illustrate the action of the drain valve 35, the linear actuator 33 is shown in its de-energized position in FIG. 3.

OPERATION

Referring to FIGS. 1 and 2, consider a typical dishwasher cycle. As the dishwasher starts, the drain valve 33 is opened momentarily to discharge residual water that may have accumulated in the tub. To initiate drain valve opening, the solenoid coil 45 of valve element 30 is energized to open the valve allowing water to flow into chamber 34. As the chamber fills, water pressure acting on rolling diaphragm 52 forces the actuator piston 53 and its associated actuating rod 55 downward, rotating the butterfly element 58 clockwise, as shown, to open the drain valve. In order to prevent high pressure forces from being transmitted to the butterfly assembly, the piston 53 is designed to "bottom out" against the housing 51 just as the butterfly valve reaches its full open position.

To convert from a draining mode to a filling mode, the solenoid coil 65 of valve 31 is energized to open the valve. Both fill valves are now open. As flow is established through the valves 30 and 31, the flow control washer 37 creates a pressure drop upstream of the actuator 33, insuring that the pressure in chamber 34 is maintained at a level too low to overcome the force of spring 54. As a result, the spring returns the butterfly valve to its closed position.

After the required timed fill, both coils 45 and 65 are de-energized and the fill valves shut off. To insure that a pressure buildup will not occur in the chamber 34, the timer can be set up to close valve element 30 a fraction of a second before element 31.

When the rinse or wash cycle is completed the drain valve 35 is opened again as discussed above. After the final drain of a complete wash cycle, the drain valve 35 must be closed to prevent back-flow from the drain into the dishwasher during the drying cycle. This can be accomplished by setting the timer to momentarily open valve element 31 to relieve pressure in chamber 34 and close the drain valve.

We now claim:

1. A fluid control system comprising fluid receiving means, an inlet passage for conducting fluid under pressure from a source to said receiving means, a discharge passage for conducting the fluid from said receiving means, first valve means operable to close said inlet passage, second valve means operable to close said inlet passage located downstream of the first, pressure control means operable to cause a pressure drop between said valves when both of said valves are open, and means responsive to fluid pressure in said inlet passage between said valve means for opening said discharge passage when said first valve only is open.

2. A fluid control system as claimed in claim 1, in which said pressure control means comprises flow restrictor means upstream of said first valve means.

3. A fluid control system as claimed in claim 1, in which said means responsive to fluid pressure comprises a pressure-operated linear actuator, and a valve in said discharge passage operatively connected to an output member of said actuator.

4. A fluid control system as claimed in claim 3, in which said valve comprises a body having seating surfaces formed on the inside wall thereof, a butterfly element pivotally supported within said body, said butterfly element having resilient sealing surfaces formed thereon engageable with said seating surfaces, and a crank arm connecting said butterfly element to the output member of said linear actuator.

5. A fluid control system as claimed in Claim 4, including baffle means formed within said body and operable to force dis-charged fluid between the inside wall of said body and one lobe of said butterfly element.

6. A valve assembly comprising a first valve element, a second valve element in series with a first, a flow control washer operable to cause a pressure drop between said valve elements when both are open and subject to fluid flow, a pressure tap between said valve elements, a third valve element independent of said first and second elements, and pressure responsive means communicating with said pressure tap and operable to open said third valve element when said first valve only is open and to close said third valve element when both said first and second valve elements are open.

7. A valve assembly as claimed in claim 6, in which said means responsive to fluid pressure comprises means defining a pressure tight chamber communicating with said pressure tap, a rolling diaphragm closing one end of said chamber, an actuating rod operatively connected to said rolling diaphragm for linear movement thereby, and means biasing said rolling diaphragm in a direction tending to reduce the volume of said chamber, whereby a predetermined pressure at said pressure tap will move said diaphragm against said biasing means.

8. A valve assembly as claimed in Claim 6, in which said third valve element comprises a body portion having inlet and outlet connections, sealing surfaces formed within said body portion, a butterfly element pivotally supported for rotation about a transverse axis of said body, resilient sealing surfaces formed on said butterfly element engageable with said seating surfaces, and a crank arm disposed outside said body and operable to rotate said butterfly element from a closed position with said sealing surfaces in contact with said seating surfaces to an open position with said surfaces out of contact.

9. A valve assembly as claimed in Claim 8, in which said butterfly element is overbalanced in a direction tending to force it into its closed position when subjected to fluid pressure from the inlet side of said valve.

10. A valve assembly comprising a first valve element; a second valve element in series with the first; pressure control means operable to cause a pressure drop between said valve elements when both are open and subject to fluid flow; a pressure tap between said valve elements; a third valve element independent of said first and second element and having a body portion including inlet and outlet connections, sealing surfaces form within said body portion, a butterfly element pivotally sup-ported for rotation about the transverse axis of said body, resilient sealing surfaces formed on said butterfly element engageable with said sealing surfaces, and a crank arm disposed outside said body and operable to rotate said butterfly element from a closed position with said sealing surfaces in contact with said seating surfaces to an open position with said surfaces out of contact, and said body portion having baffle means within said body operable to confine the flow of fluid therethrough to an area between one wall of said body and said transverse axis, and pressure responsive means communicating with said pressure tap and operable to open said third valve element when said first valve only is open and to close said third valve element when both said first and second valve elements are open.

* * * * *